US012650239B2

(12) United States Patent
Loutz et al.

(10) Patent No.: US 12,650,239 B2
(45) Date of Patent: Jun. 9, 2026

(54) MAGNETIC VENT COVER

(71) Applicants: Omri Loutz, Ashkelon (IL); Yuval Bar-Hai, Ashkelon (IL)

(72) Inventors: Omri Loutz, Ashkelon (IL); Yuval Bar-Hai, Ashkelon (IL)

(73) Assignee: YOBL DIGITAL MARKETING INC., Madison, WI (US)

( * ) Notice: Subject to any disclaimer, the term of this patent is extended or adjusted under 35 U.S.C. 154(b) by 401 days.

(21) Appl. No.: 18/384,924

(22) Filed: Oct. 30, 2023

(65) Prior Publication Data

US 2024/0142133 A1 May 2, 2024

Related U.S. Application Data

(60) Provisional application No. 63/420,692, filed on Oct. 31, 2022.

(51) Int. Cl.
*F24F 13/08* (2006.01)
*F16L 55/115* (2006.01)
(52) U.S. Cl.
CPC ........... *F24F 13/084* (2013.01); *F16L 55/115* (2013.01)
(58) Field of Classification Search
CPC ....... F24F 13/084; F16L 55/115; F16L 37/004
USPC ......................................................... 138/89
See application file for complete search history.

(56) References Cited

U.S. PATENT DOCUMENTS

| | | | | |
|---|---|---|---|---|
| 3,894,527 A * | 7/1975 | Ickes | ...................... | F24B 1/192 |
| | | | | 49/478.1 |
| 5,479,984 A * | 1/1996 | Easterbrook | ............ | F24F 13/08 |
| | | | | 454/289 |
| 5,525,145 A * | 6/1996 | Hodge | .................. | F24F 13/085 |
| | | | | 55/516 |
| 8,292,708 B2 * | 10/2012 | Viggers | .................. | F24F 13/20 |
| | | | | 454/275 |
| 10,197,202 B2 * | 2/2019 | Vasquez | ............... | F16L 37/004 |
| 11,181,296 B2 * | 11/2021 | Regnier | ............... | F24F 13/084 |
| 12,222,130 B2 * | 2/2025 | Regnier | ............... | F24F 13/084 |
| 2008/0160904 A1 * | 7/2008 | Yi | ........................... | F24F 13/06 |
| | | | | 454/309 |
| 2009/0084050 A1 * | 4/2009 | Moore | .................... | F24F 13/20 |
| | | | | 52/203 |
| 2014/0302772 A1 * | 10/2014 | Nizich | .................. | F24F 13/084 |
| | | | | 454/334 |
| 2016/0238275 A1 * | 8/2016 | Rasmussen | ........... | F24F 13/084 |
| 2020/0263887 A1 * | 8/2020 | Mergener | .............. | F24F 13/084 |
| 2020/0370785 A1 * | 11/2020 | Gunn | .................... | F24F 13/084 |
| 2023/0280068 A1 * | 9/2023 | Fiello | .................... | F24F 13/082 |
| | | | | 454/275 |

* cited by examiner

*Primary Examiner* — David Bochna
(74) *Attorney, Agent, or Firm* — SLEMAN & LUND LLP

(57) ABSTRACT

A vent cover configured restrict air flow from an air vent. The vent cover comprises a multi-layer frame having at least two layers. The vent cover further comprises a plurality of magnets, wherein the plurality of magnets is integrated into the multi-layer frame through a plurality of apertures. The plurality of magnets are positioned within a plurality of apertures arranged within the multi-layer frame.

16 Claims, 7 Drawing Sheets

MAGNETIC VENT COVER

REFERENCE TO RELATED APPLICATIONS

This application claims the benefit under 35 U.S.C. § 119(e) of U.S. Provisional Patent Application No. 63/420,692, filed on Oct. 31, 2022, the entirety of which is incorporated by reference.

BACKGROUND OF THE INVENTION

Heating, ventilation, and air condition (HVAC) systems are used in commercial and residential properties to provide heated air and cool air to a property. However, there are times when a property owner would prefer to block, or restrict, the flow of air from the HVAC system. There are also times where the HVAC system is not operational, and the owner would prefer to block or restrict passive air from entering into the residential or commercial property. In these cases, vent covers are used in residential and commercial properties as a means for blocking or restricting the flow of air from as necessary.

Many vent covers are not able to sufficiently block or restrict air flow. This is due, in part, to the design of the vent cover. The typical design does not account for the raised and raised portions of air vents. This includes the air vent grill or grates, diffuser, etc. The typical vent cover cannot achieve a proper seal when the shape of the vent cover does not account for the raised portions of the air vent.

Also, many vent covers fail to provide a tight seal between the vent cover and the air vent. This can result in the vent cover moving or being jostled when there is air contacting the vent cover. Typical vent covers can also become detached from the vent when hit or bumped by something or someone. This can result in inadequate restriction of air flow from the vent, which can result in a significant increase in air draft from the vent.

There exists a need for a vent cover that has a tailored fit that accounts for the raised portions of the vent, and a has strong attachment to the air vent, which creates a tight seal between the vent cover and the air vent.

SUMMARY OF THE INVENTION

Aspects of the disclosure relate to methods and apparatuses relating to a magnetic vent cover configured to restrict air flow from an air vent. The vent cover includes a multi-layer frame and a plurality of magnets. The multi-layer frame has at least three layers. The plurality of magnets is integrated into the multi-layer frame through a plurality of apertures. The plurality of magnets are positioned within a plurality of apertures arranged within the multi-layer frame Aspects of the disclosure further related to a vent cover comprising a first layer, second layer, third layer, and a plurality of magnets. The second layer has a plurality of apertures positioned around an outer edge of the second layer. The second layer also includes a first central aperture. The third layer has a second central aperture. The plurality of magnets is positioned within the plurality of apertures.

Aspects of the disclosure further relate to a method of using a vent cover to restrict air flow from an air vent. The method includes providing a vent cover. The vent cover includes a multi-layer frame having at least three layers, wherein the at least three layers form a central pocket. The vent cover further includes a plurality of magnets, wherein the plurality of magnets is integrated into the multi-layer frame through a plurality of apertures. The method further including aligning the vent cover with the air vent such that any raised portion of the air vent are covered by the pocket of the multi-layer frame. The method further including placing the vent cover of the air vent, wherein the plurality of magnets creates a magnetic attachment between the vent cover and the air vent.

These and other aspects of the disclosure will be described in greater detail below.

BRIEF DESCRIPTION OF DRAWINGS

The present disclosure is illustrated by way of example and not limited in the accompanying figures in which like reference numerals indicate similar elements and in which.

DETAILED DESCRIPTION

The present disclosure relates to a vent cover 10. The vent cover 10 is configured to fit over any conventional air vent 12. The air vent 12 can be located in the floor or in a wall, or in a ceiling of a residential or commercial building. The vent cover 10 provides a tight seal around the air vent 12, such that little to no air is allowed to escape from the air vent 12. The vent cover 10 is designed for efficient airflow management, expertly blocking and/or modulating airflow across air vents 12 to grant more precise control over an indoor climate.

Figure 1:
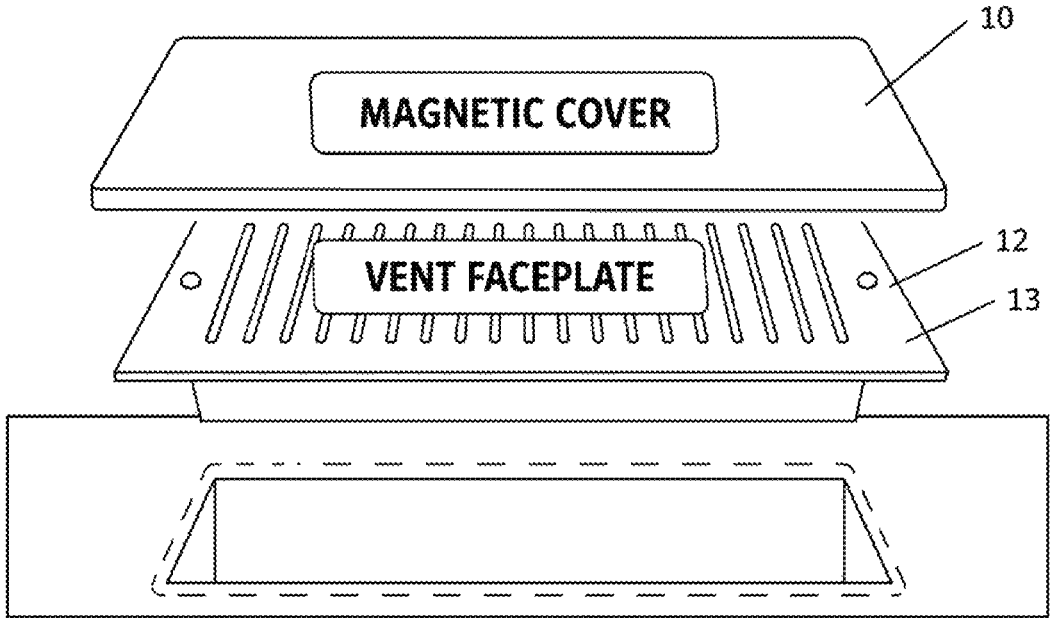
FIG. 1 illustrates a perspective view of a vent cover and an air vent.

Referring to FIG. 1, the vent cover 10 maybe manufactured in any shape or size to fit any shape or size faceplate 13 of an air vent 12. For example, the vent cover 10 may be substantially rectangular shaped to accommodate a rectangular shaped air vent 12. In another example, the vent cover 10 may be substantially square shaped to accommodate a substantially square shaped air vent 12.

The vent cover 10 may be sized appropriately to fit different sized air vents 12. The width of the vent cover 10 may range from about 2 inches to about 13 inches. The width of the vent cover 10 may be about two inches, or about 3 inches, or about four inches, or about 5 inches, or about 6 inches, or about 7 inches, or about 8 inches, or about 9 inches, or about 10 inches, or about 11 inches, or 12 is, or about 13 inches. In some embodiments, the width of the vent cover 10 may be about 8.75 inches. In other embodiments, the width of the vent cover 10 may be about 12.75 inches.

The length of the vent cover 10 may range from 8 inches to about 16.75 inches. The length of the vent cover 10 may be about 8 inches, or about 8.5 inches, or about 8.75 inches, or about 9 inches, or about 9.5 inches, or about 9.75 inches, or about 10 inches, or about 10.5 inches, or about 10.75 inches, or about 11 inches, or by 11.5 inches, or about 11.75 inches, or about 12 inches, or about 12.5 inches, or about 13 inches, about 13.5 inches, or about 13.75 inches, or about 14 inches, or about 14.5 inches, or about 14.75 inches, or about 15 inches, or about 15.5 inches, or about 15.75 inches, or about 16 inches, or about 16.5 inches, or about 16.75 inches.

In an example embodiment, the vent cover 10 is 4 inches wide by 12.5 inches long, or four inches wide by 14.5 inches long, or 4 inches wide or 16.5 inches long.

In another example embodiment, the vent cover 10 is 6 inches wide by 10.75 inches long, or 6 inches wide by 12.75 inches long, or 6 inches wide by 14.75 inches long, or 6 inches wide by 16.75 inches long.

In another example embodiment, the vent cover 10 may be 8.75 inches wide by about 8.75 inches long, or 8 inches wide by 10.75 inches long, or 8 inches wide by 12.75 inches long, or 8 inches wide by 14.75 inches long, or 8 inches wide by 16.75 inches long.

Figure 2:
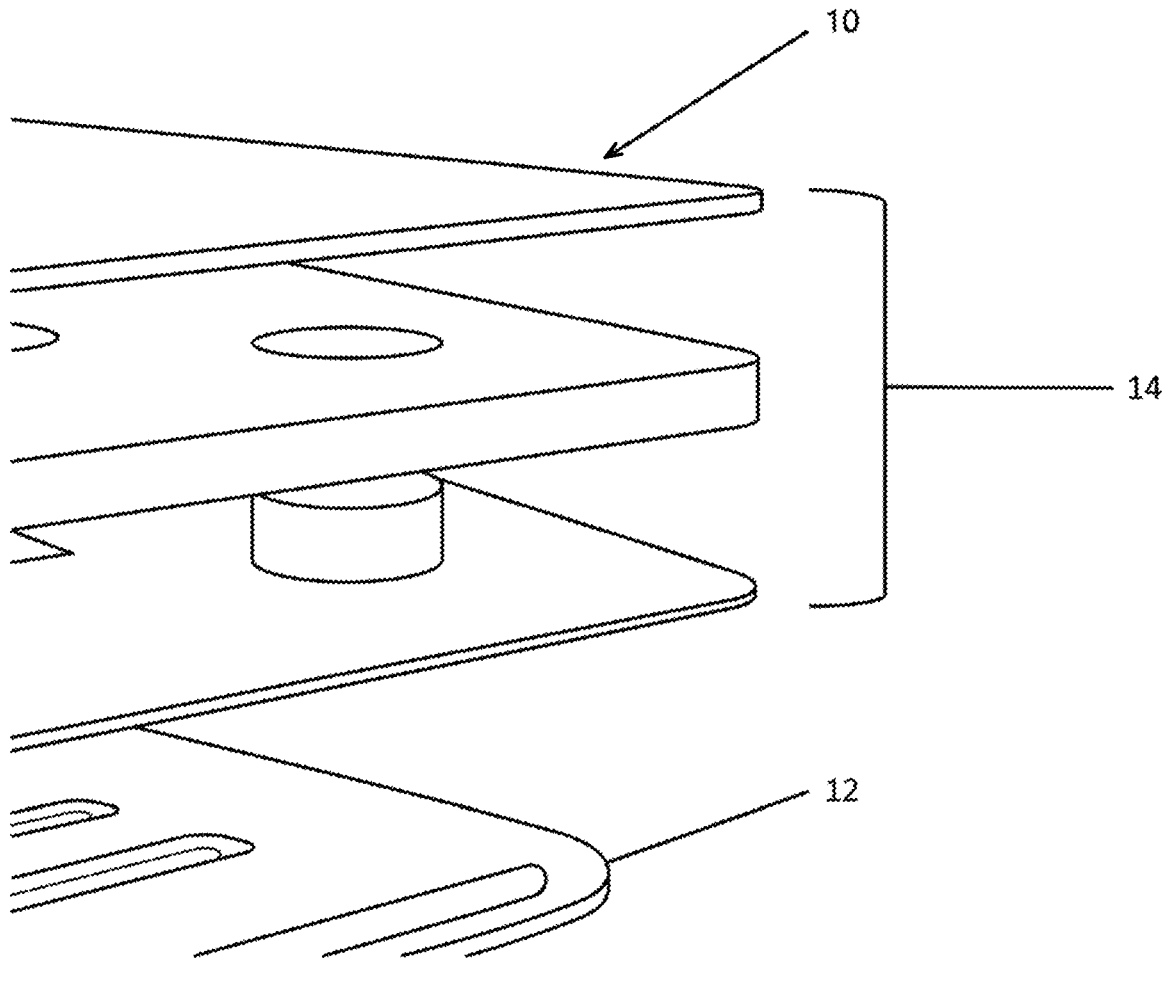
FIG. 2 illustrates an expanded view of a multi-layer frame of the vent cover.
Figure 3:
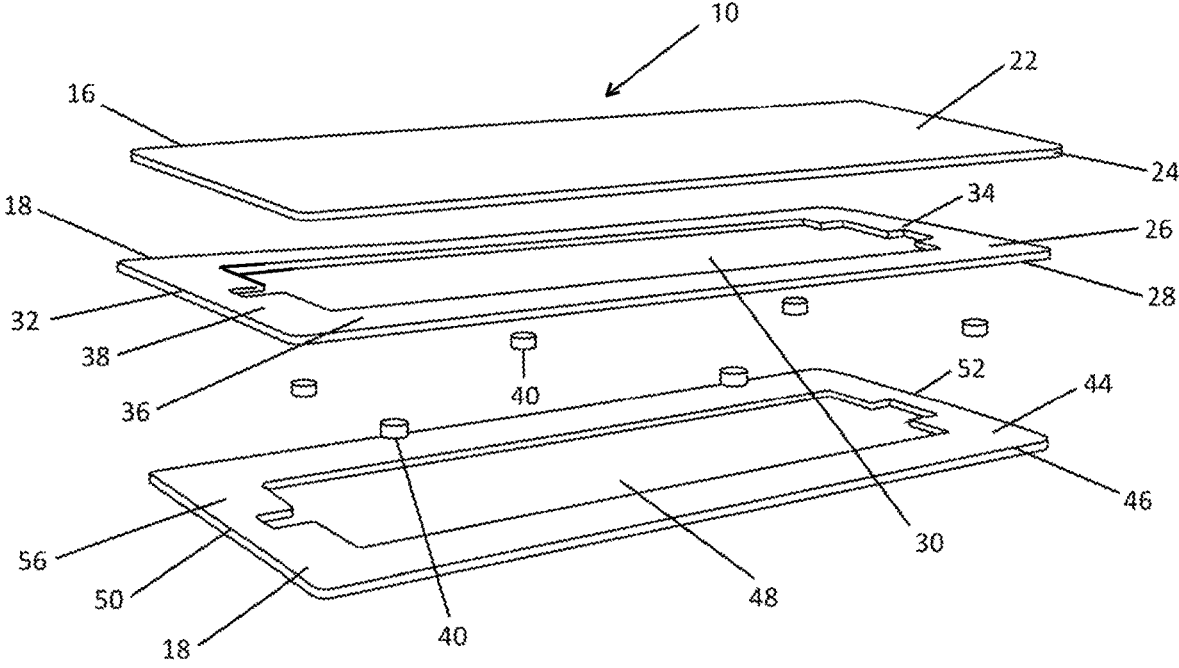
FIG. 3 illustrates an expanded view of an embodiment of the multi-layer frame having three layers.

In another example embodiment, the vent cover 10 may be 10.75 inches wide by 10.75 inches long, or 10 inches wide by 12.75 inches long, or 10 inches wide by 14.75 inches long, or 10 inches wide by 16.75 inches long. In another example embodiment the vent cover 10 is 12.75 inches wide by 12.75 inches long Referring to FIG. 2, the vent cover 10 includes a multi-layer frame 14 that forms the vent cover 10. The multilayer frame 14 has a plurality of layers that are attached to one another to form the vent cover 10. For example, the vent cover may have at least three layers. Referring to FIG. 3, the three layers may include a first layer 16, a second layer 18, and a third layer 20. In another example, the multi-layer frame has more than three layers. The layers of the multi-layer frame 14 may have substantially similar sizes. In some embodiments, the layers are distinct in their shapes and sizes.

The multi-layer frame 14 may be made of any heat and cold resistant material or composite materials. The multi-layer frame 14 may also be made of a magnetic material or composite materials. In some embodiment, the multi-layer 14 is made of at least one magnetic material and one thermal resistant material.

Referring again to FIG. 3, the first layer 16 may be a top layer of the multi-layer frame 14. The first layer 16 includes a upper surface 22 and a lower surface 24. The upper surface 22 is distal to the air vent 12 while the lower surface 24 of the first layer 16 is proximal to the air vent 12. The lower surface 24 is configured to magnetically and adhesively, attach to the second layer 18. The upper surface 22 and the lower surface 24 may be substantially the same size and shape.

The first layer 16 is configured to provide a barrier that effectively seals off airflow, or substantially impede air flow, paving the way for enhanced energy efficiency. To achieve the seal of the airflow, the first layer is made of a material that provides a seal between the vent cover 10 and the air vent 12 and is a magnetic material.

In one example, the first layer 16 of the vent cover 10 may be made of one single material. In another example, the upper surface 22 and the lower surface 24 of the first layer 16 may be made from a composite material. For example, the upper surface 22 may be made of a flexible plastic and bottom 24 may be made of a magnetic rubber. In an example embodiment, the upper surface 22 of the first layer 16 is made of a PVC overlay, and the lower surface 24 of the top layer is made of a flexible anisotropic magnetic rubber.

The upper surface 22 of the first layer 16 can be made in any color that meets the user's aesthetic desires. For example, the upper surface 22 of the first layer 16 may be painted or coated in one or more color shades. The default shades being white and black. The upper surface 22 of the first layer 16 may be printed or customized with any design that the user chooses.

The first layer 16 may be sized and shaped according to the overall desired size and shape of the vent cover 10. The first layer 16 can be manufactured in any thickness. In some embodiments, the first layer 16 has a thickness that is less than the second layer 18, and the same thickness as the bottom layer 20. In other embodiments, the first layer 16 is the different thickness than both the second layer 18 and the third layer 20.

Referring again to FIG. 3, the second layer 18 may be a middle layer the multi-layer frame 14. The second layer 18 includes upper surface 26 and a lower surface 28. The upper surface 26 is distal to the air vent 12 while the lower surface 28 of the second layer 18 is proximal to the air vent 12. The second layer 18 may include a central aperture 30 that extends from the upper surface 26 to the lower surface 28 and from a first end 32 to a second end 34. The central aperture is bounded on all sides by the outer edge 38 of the second layer 18.

The central aperture 30 may be sized and shaped to accommodate grills or grates of an air vent. The central aperture 30 may also be sized to accommodate a diffuser, and/or any other additional features located on an upper surface of the air vent 10. The central aperture 30 has a thickness that is not greater than an overall thickness of the second layer 18.

The second layer 18 may be sized and shaped according to the overall desired size and shape of the vent cover 10. In some embodiments, the second layer 16 has the same length and width as the first layer 16. In other embodiments, the second layer 18 has a shorter length and width than the width and the length of the first layer 16.

The second layer 18 can be manufactured in any thickness. In some embodiments, the first layer 16 has a thickness that is greater than the second layer 18, and the same thickness as the bottom layer 20. In other embodiments, the second layer 18 is different thickness than both the first layer 16 and the third layer 20. In other embodiments, the second layer 18 may be the same thickness as the first layer, and the third layer 20. In certain embodiments, the second layer 18 is about 4 mm.

The second layer 18 may also include a plurality of outer apertures 36 that are placed along the outer edge 38 of the second layer 18. The plurality of outer apertures 36 each extend from the upper surface 26 to the lower surface 28 of the second layer 18. The plurality of outer apertures 36 are configured to receive a plurality of magnets 40. In an embodiment, there are 6 outer apertures 36 that are configured to receive 6 magnets 40. Each outer aperture 36 receives one magnet. The outer apertures 36 are shaped and sized to fit the shape and size of the plurality of magnets 40. For example, the outer apertures 36 have a diameter and a height that corresponds with a height and a diameter of the plurality of magnets 40. In some embodiments, the height and the diameter of the outer apertures 36 is substantially similar to, or equal to, the height and the diameter of each corresponding magnet 40. In some embodiments, the height of the outer apertures is about 4 mm and the diameter of the outer apertures 36 is about 12 mm.

The second layer 18 is configured to provide a light, yet strong supportive layer for optimal sealing. To achieve the seal of the airflow, the second layer 18 is made of a material that provides a seal between the first layer 16 and the third layer 20. In one example, the second layer 18 of the multi-layer frame 14 may be made of one single material. In another example, the second layer 18 may be made of a composite material. For example, the second layer 18 may be a flexible ethylene-vinyl-acetate.

Referring again to FIG. 3, the third layer 20 may be a bottom layer of the multi-layer frame 14. The third layer 20 includes an upper surface 44, a lower surface 46, a first end 50, and a second end 52. The upper surface 44 is distal to the air vent 12 while the lower surface 46 of the third layer 20 is proximal to the air vent 12.

The third layer 20 may include a central aperture 48 that extends from the upper surface 44 to the lower surface 46 and from the first end 50 to the second end 52. The central aperture 48 is bounded on all sides by an outer edge 56 of the third layer 20.

The central aperture 48 may be sized and shaped to accommodate grills or grates of an air vent. The central aperture 48 may also be sized to accommodate a diffuser, and/or any other additional raised features located on a top surface of the air vent 12.

Figure 4:
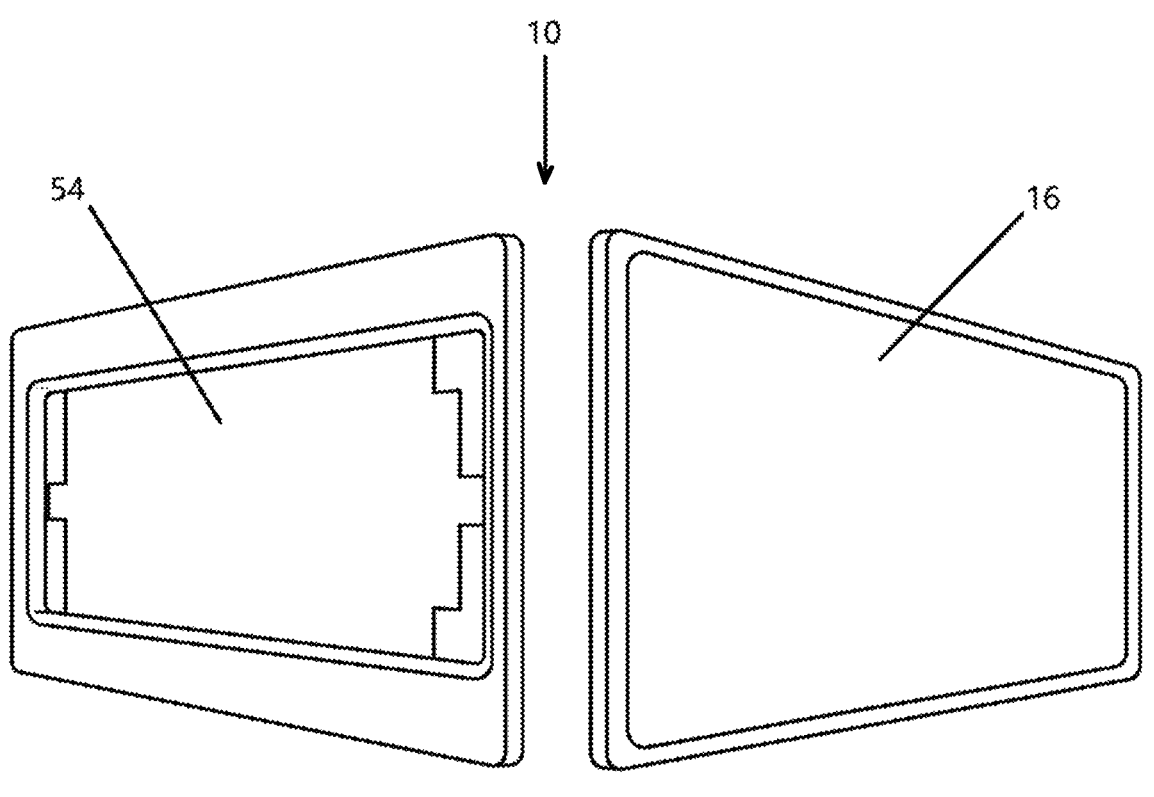
FIG. 4 illustrates a top and bottom view of the vent cover.

Referring to FIGS. 3 and 4, the central aperture 48 may be substantially the same size and shape as the central aperture 30 of the second layer 16 such that when then the second layer 18 and the third layer 20 are attached to one another, the central aperture of the second layer 30 and the central aperture of the third layer 48 create a pocket 54 within the multi-layer frame 14 that is configured to receive the grills/grates and the other raised features of the air vent 12, including diffusers. The pocket 54 has a depth that corresponds to a height of the grill/grates of the air vent 12. In some embodiments, the depth of the pocket 54 is at least 4 mm.

The third layer 20 may be sized and shaped according to the overall desired size and shape of the vent cover 10. In some embodiments, the third layer 20 has the same length and width as the first layer 16, and the second layer 18. In other embodiments, the third layer 20 has a shorter length and width than the width and the length of the first layer 16 and/or the second layer 18.

The third layer 20 can be manufactured in any thickness. In some embodiments, the third layer 20 has a thickness that is less than the second layer 18, and the same thickness as the first layer 16. In other embodiments, the third layer 18 is a different thickness than both the first layer 16 and the second layer 18. In other embodiments, the third layer 20 may be the same thickness as the first layer 16, and the second layer 18. In certain embodiments, the third layer 20 is less than or equal to 4 mm.

The third layer 20 is made of a magnetically conductive material. In one example, the third layer 20 of the multi-layer frame 14 may be made of one single material. In another example, the third layer 20 may be made of a composite material. For example, the third layer 20 may be an antistrophic magnetic rubber.

The plurality of magnets 40 are configured to magnetically attach the vent cover 10 to the air vent 12. The number of magnets 40 is chosen to increase the strength of the connection between the vent cover 10 and the air vent 12.

Referring again to FIG. 3, the plurality of magnets 40 may be attached to the outer apertures 36 of the second layer 18 of the multi-layer frame 14 using any suitable attachment method. For example, the plurality of magnets 40 may be attached using an adhesive.

The plurality of magnets 40 are chosen for their magnetic strength. In some embodiments, the plurality of magnets 40 are N35 grade, neodymium magnets. The plurality of magnets 40 include a height and a diameter that is chosen according to the size of the vent cover 10. The plurality of magnets 40 may each have substantially similar, or equal heights and diameters. In some embodiments, the height of the plurality of magnets 40 is about 4 mm and the diameter of the plurality of magnets 40 is about 12 mm.

Prior to use, the multi-layer frame 14 of the vent cover 10 is assembled. The plurality of magnets 40 are inserted into the corresponding outer apertures 36 of the second layer 18 of the multi-layer frame 14. In some embodiments, the diameter of the outer apertures 36 are sized to keep the plurality of magnets 40 from becoming dislodged once inserted. In some embodiments, the plurality of magnets 40 are sealed in or adhesively attached to the outer apertures 36 to prevent the plurality of magnets 40 from becoming dislodged.

For example, six magnets 40 are inserted into six outer apertures 36 that our located around the outer edge 38 of the second layer 18. The six magnets 40 are held tightly by the diameter of the outer apertures 36 and/or the six magnets 40 are sealed within the outer apertures 36 to prevent them from being dislodged. The six magnets 40 are also sealed in the outer apertures 36 using any suitable sealing process, including adhesive. This prevents the magnets 40 from being dislodged.

The layers are then attached to one another to form the vent cover 10. The layers of the multi-layer frame 14 are magnetically attached to one another and held together by the magnetic force of the plurality of magnets 40. The layers of the multi-layer frame 14 are also adhesively attached to one another. For example, glue is typically used to adhesively attach the layers to together to form the multi-layer frame 14.

The layers are joined together and held together by magnetic force and by an adhesive. In some embodiments, the first layer 16 and the third layer 20 are attached to the second layer 16. The first layer 16 and the third layer 20 are magnetically attached to the second layer 16 using a magnetic force applied by the plurality of magnets 40 that are within the outer apertures 36 of the second layer 16. The first layer 16 and the third layer 20 are also adhered to the second layer 16 using any suitable adhesive. This prevents the multi-layer frame 14 of the vent cover 10 from detaching before, during, or after use.

Prior to use, the size and shape of the vent cover 10 is chosen to correspond with the size and shape of the faceplate 13 of the air vent 12 on which the vent cover 10 is to be applied. The process of choosing the proper shape and size of the vent cover 10 is important to maintaining a strong seal between the vent cover 10 and the air vent 12.

Figure 5:
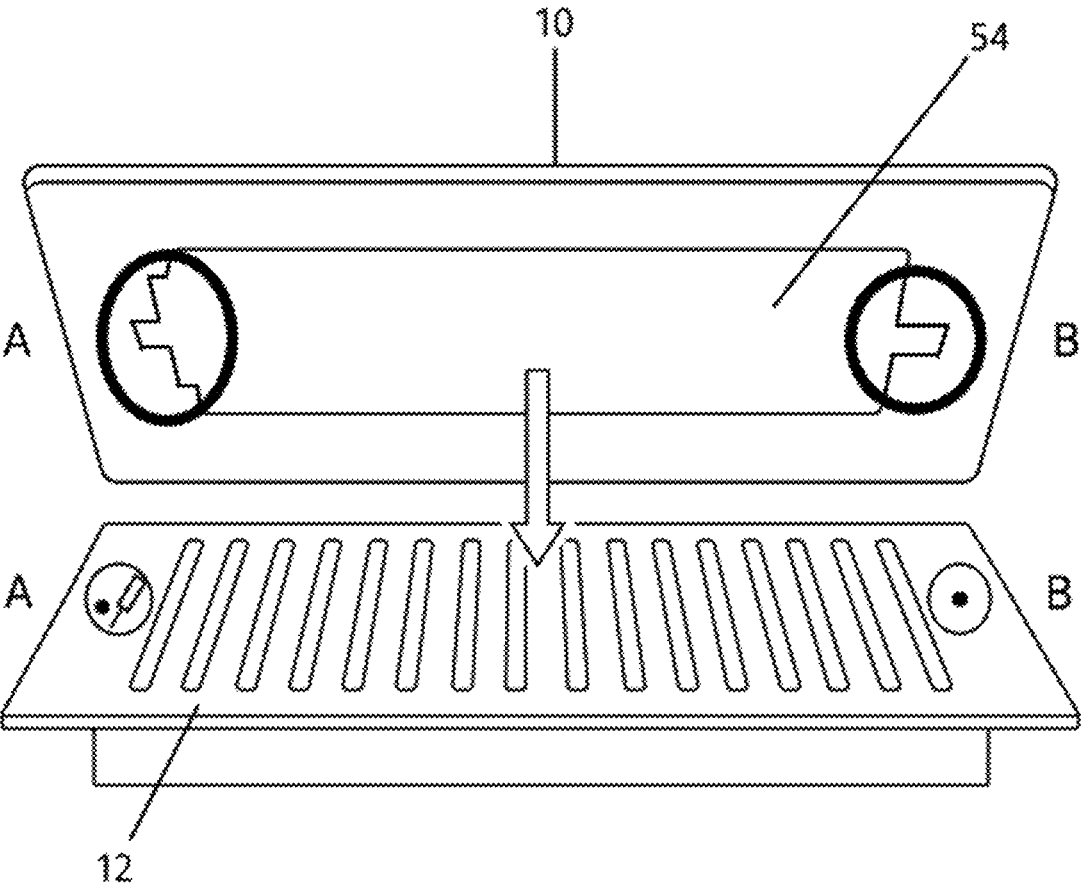
FIG. 5 illustrates a pocket of the vent cover corresponding with raised portions of the air vent.
Figure 6A:
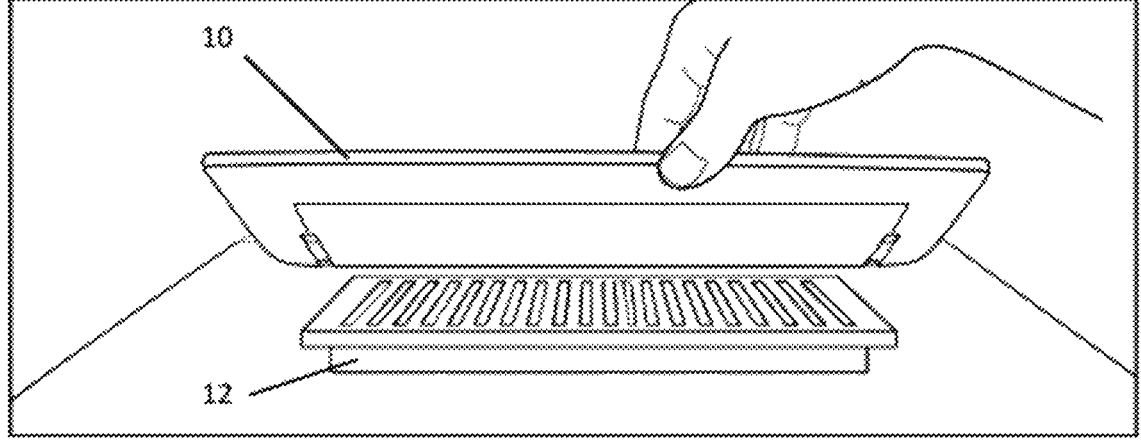
FIG. 6a illustrates a method of placing the vent cover over the air vent.
Figure 6B:
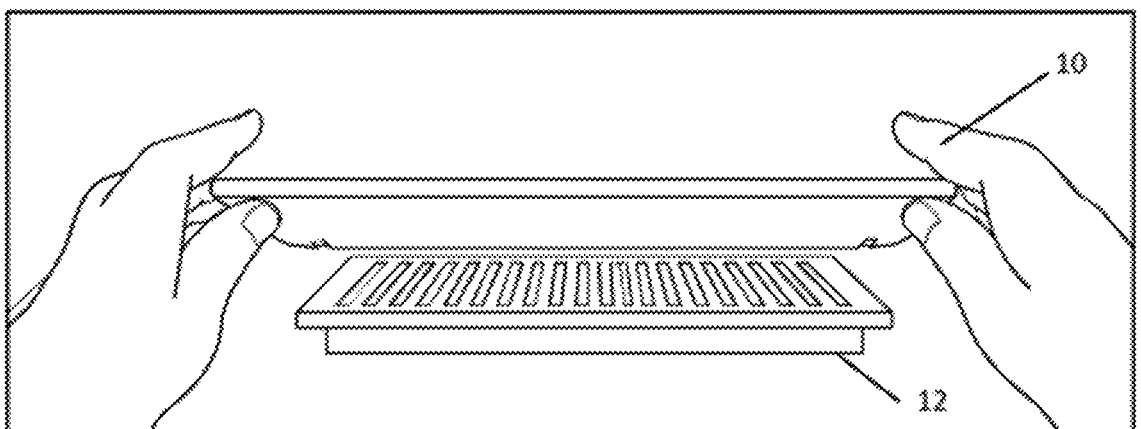
FIG. 6b illustrates the method of placing the vent cover over the air vent.

Referring to FIGS. 5 and 6, once the appropriately sized and shaped vent cover 10 has been determined, the user may align the pocket 54 of the multi-layer frame 14 with the faceplate 13 of the air vent 12 such that the grills/grates of the air vent 12 and any raised features of the air vent 12, such as diffusers, are located within the pocket 54 of the vent cover 10.

If the user finds that the raised portions of the vent, i.e. diffuser lever, are not accommodated by the pocket 54, the user may cut a small portion of the first layer 16 that is sized and shaped to tightly fit any raised parts of the air vent 12. The cut portion of the first layer 16 may extend from the upper surface 22 to the lower surface 24 of the first layer 16 and provide the space of any raised portions of the air vent 12 to protrude from the vent cover 10.

Figure 7A:
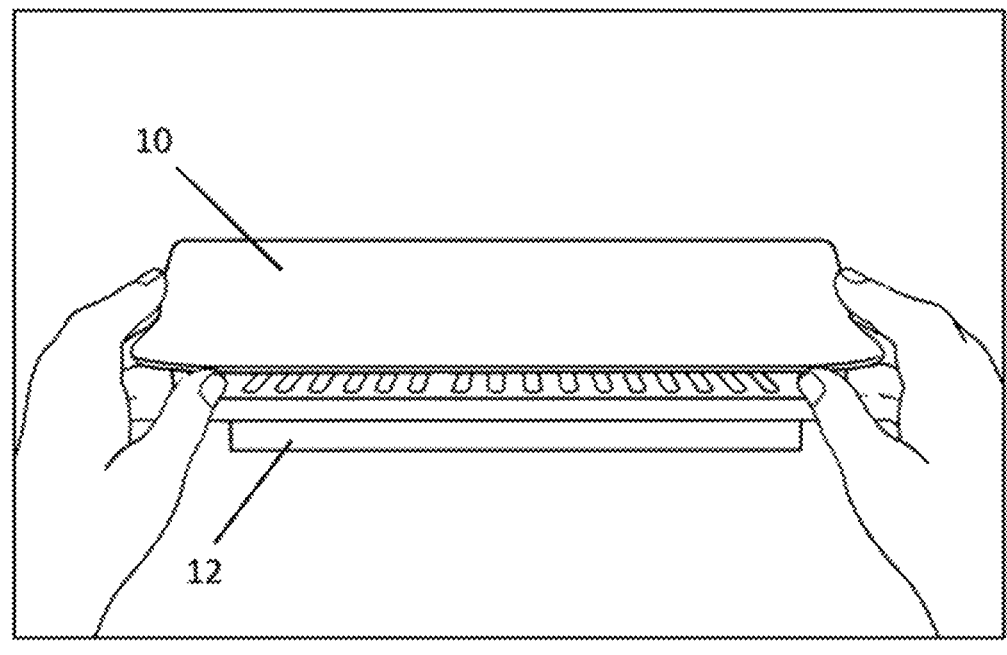
FIG. 7a illustrates a method of removing the vent cover from the air vent.
Figure 7B:
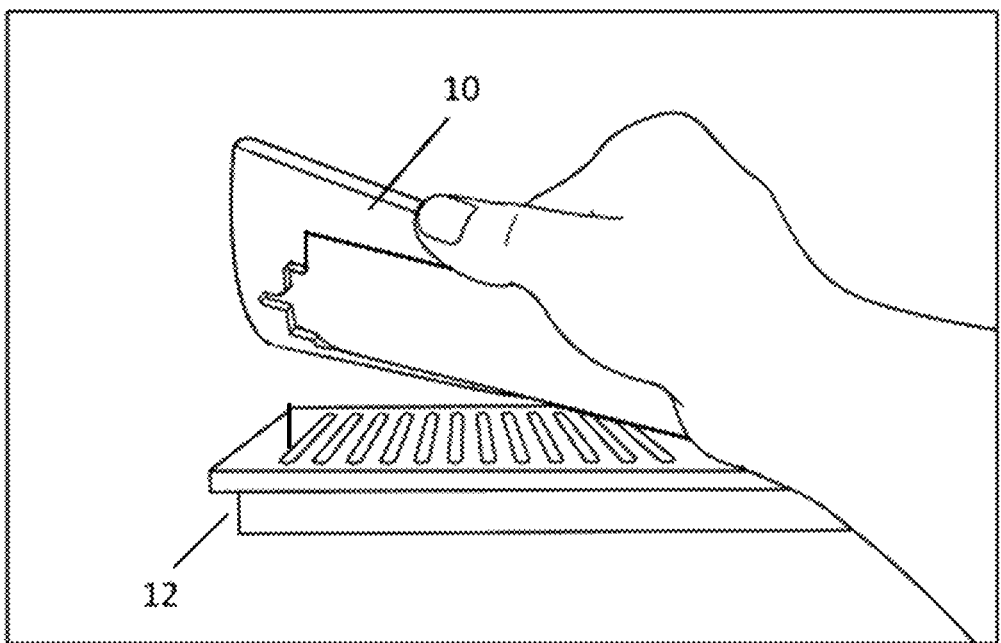
FIG. 7b illustrates the method of removing the vent cover from the air vent.

Once the vent cover 10 is applied to the air vent 12, the vent cover 10 is held in place by the magnetic attraction between the plurality of magnets 40 and metal that is within the air vent 12. The magnetic attraction will keep the vent cover 10 attached and sealed to the air vent 12 until the user 12 disconnects the vent cover 10 from the air vent 12. Referring to FIG. 7, the vent cover 10 may be removed by breaking the magnetic connection between the air vent 12 and the vent cover. This can be done by placing an object (such has a hand) between the vent cover 20 and the air vent 10 and pulling the vent cover 10 away from the air vent 12. When the vent cover 10 is pulled away from the vent cover, 12 the magnetic attraction is weakened allowing for the complete removal of the vent cover 12. The vent cover 10 can be stored until further use.

The vent cover 10 has been advantageously designed to provide a seamless and tailored fit between the vent cover 10 and the air vent 12. The integrated magnet design for superior hold between the vent cover 10 and air vent 12, even under the force of airflow. The integrated magnet design also allows for easy installation and removal.

The advantageous vent cover design also allows for more user control over airflow from the air vent 12. The vent covers are designed not just to block, but also to regulate unwanted air flow through the air vent. Directing air flow efficiently means that the users heating and cooling systems will not have to work as hard. This can lead to a significant savings on the user's electricity bills.

In addition to blocking air flow, the advantageous vent cover design also dampens loud noises and significantly reduce odors that may escape from air vents. The vent covers may block or significantly reduce dust, dirt and other air-borne particles that may escape from the air vent.

The invention claimed is:

1. A vent cover for an air vent, the vent cover comprising:
a multi-layer frame having at least two layers including a first layer and a second layer, the second layer having a plurality of apertures positioned around an outer edge of the second layer, and a first central aperture config-ured to receive portions of the air vent, the first central aperture having a substantially rectangular shape with lateral extensions that extend in opposing directions from the substantially rectangular shape; and
a plurality of magnets, wherein the plurality of magnets are positioned within the plurality of apertures arranged within the second layer of the multi-layer frame.

2. The vent cover of claim 1, wherein the at least two layers includes a top layer, a middle layer, and a bottom layer.

3. The vent cover of claim 2, wherein the top layer has an integrated PVC upper surface and an anisotropic magnetic rubber bottom portion.

4. The vent cover of claim 2, wherein the middle layer is made of Ethylene-vinyl acetate.

5. The vent cover of claim 2, wherein the middle layer includes the plurality of apertures.

6. The vent cover of claim 2, wherein the bottom layer is made of anisotropic magnetic rubber.

7. The vent cover of claim 2, wherein the top layer, the middle layer and the bottom layer are adhesively attached to each other.

8. The vent cover of claim 1, wherein the plurality of magnets are neodymium magnets.

9. The vent cover of claim 8, wherein the second layer is made of Ethylene-vinyl acetate.

10. The vent cover of claim 8, wherein the third layer is made of anisotropic magnetic rubber.

11. A vent cover comprising:
a first layer;
a second layer having plurality of apertures positioned around an outer edge of the second layer, and a first central aperture;
a third layer having a second central apertures; and
a plurality of magnets, wherein the plurality of magnets is positioned within the plurality of apertures.

12. The vent cover of claim 11, wherein the first layer, second layer and third layer are magnetically and adhesively attached to each other.

13. The vent cover of claim 12, wherein when attached, the first central aperture of the second layer is aligned with the second central aperture of the third layer.

14. The vent cover of claim 13, wherein the alignment creates a pocket configured to receive portions of an air vent.

15. The vent cover of claim 14, wherein the first layer includes an integrated PVC upper surface and an anisotropic magnetic rubber bottom portion.

16. The vent cover of claim 11, wherein the plurality of magnets are neodymium magnets.

* * * * *